US011862129B2

(12) United States Patent
Christensen et al.

(10) Patent No.: US 11,862,129 B2
(45) **Date of Patent: *Jan. 2, 2024**

(54) IMAGE LOCATION BASED ON PERCEIVED INTEREST AND DISPLAY POSITION

(71) Applicant: Micron Technology, Inc., Boise, ID (US)

(72) Inventors: Carla L. Christensen, Boise, ID (US); Zahra Hosseinimakarem, Boise, ID (US); Bhumika Chhabra, Boise, ID (US); Radhika Viswanathan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,193

(22) Filed: Sep. 28, 2022

(65) Prior Publication Data

US 2023/0021202 A1 Jan. 19, 2023

Related U.S. Application Data

(63) Continuation of application No. 16/996,816, filed on Aug. 18, 2020, now Pat. No. 11,468,869.

(51) Int. Cl.
*G09G 3/38* (2006.01)
*G09G 5/38* (2006.01)

(52) U.S. Cl.
CPC ....... *G09G 5/38* (2013.01); *G09G 2340/0464* (2013.01); *G09G 2354/00* (2013.01)

(58) Field of Classification Search
CPC ............. G09G 5/38; G09G 2340/0464; G09G 2354/00
See application file for complete search history.

(56) References Cited

U.S. PATENT DOCUMENTS

| | | | | |
|---|---|---|---|---|
| 6,445,409 | B1 | 9/2002 | Ito et al. | |
| 11,468,869 | B2 * | 10/2022 | Christensen | G09G 5/38 |
| 2008/0089590 | A1 | 4/2008 | Isomura et al. | |
| 2010/0172550 | A1 * | 7/2010 | Gilley | G11B 27/034 382/218 |
| 2013/0258129 | A1 | 10/2013 | Burns | |
| 2014/0019917 | A1 | 1/2014 | Piemonte et al. | |
| 2020/0244716 | A1 | 7/2020 | Mehta et al. | |

(Continued)

*Primary Examiner* — Samantha (Yuehan) Wang
(74) *Attorney, Agent, or Firm* — Brooks, Cameron & Huebsch, PLLC

(57) ABSTRACT

Methods, apparatuses, and non-transitory machine-readable media for image location based on a perceived interest and display position. Apparatuses can include a display, a memory device, and a controller. an example controller can assign a perceived interest and sort images based in part on the perceived interest. In another example, a method can include assigning, by a controller coupled to a memory device, a perceived interest to an image of a plurality of images, wherein the perceived interest is assigned based in part on a change in position of a display coupled to the memory device while the image is viewable on the display, selecting the image from an initial viewing location on the display responsive to the assigned perceived interest, and transferring the image to a different viewing location, wherein the initial viewing location and the different viewing location are visible on the display.

18 Claims, 6 Drawing Sheets

(56) References Cited

U.S. PATENT DOCUMENTS

| | | | |
|---|---|---|---|
| 2020/0257302 A1 | 8/2020 | Bozchalooi | |
| 2020/0257943 A1 | 8/2020 | Huber et al. | |
| 2020/0258313 A1 * | 8/2020 | Chen | G06T 19/006 |
| 2020/0260048 A1 | 8/2020 | Merg et al. | |

* cited by examiner

IMAGE LOCATION BASED ON PERCEIVED INTEREST AND DISPLAY POSITION

PRIORITY INFORMATION

This application is a Continuation of U.S. application Ser. No. 16/996,816, filed Aug. 18, 2020, the contents of which are incorporated herein by reference.

TECHNICAL FIELD

The present disclosure relates generally to apparatuses, non-transitory machine-readable media, and methods for image location based on a perceived interest and display position.

BACKGROUND

Images can be viewed on computing devices. A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can include a display used to view images and/or text. The display can be a touchscreen display that serves as an input device. When a touchscreen display is touched by a finger, digital pen (e.g., stylus), or other input mechanism, associated data can be received by the computing device. The touchscreen display may include pictures and/or words, among others that a user can touch to interact with the device.

DETAILED DESCRIPTION

Figure 1:
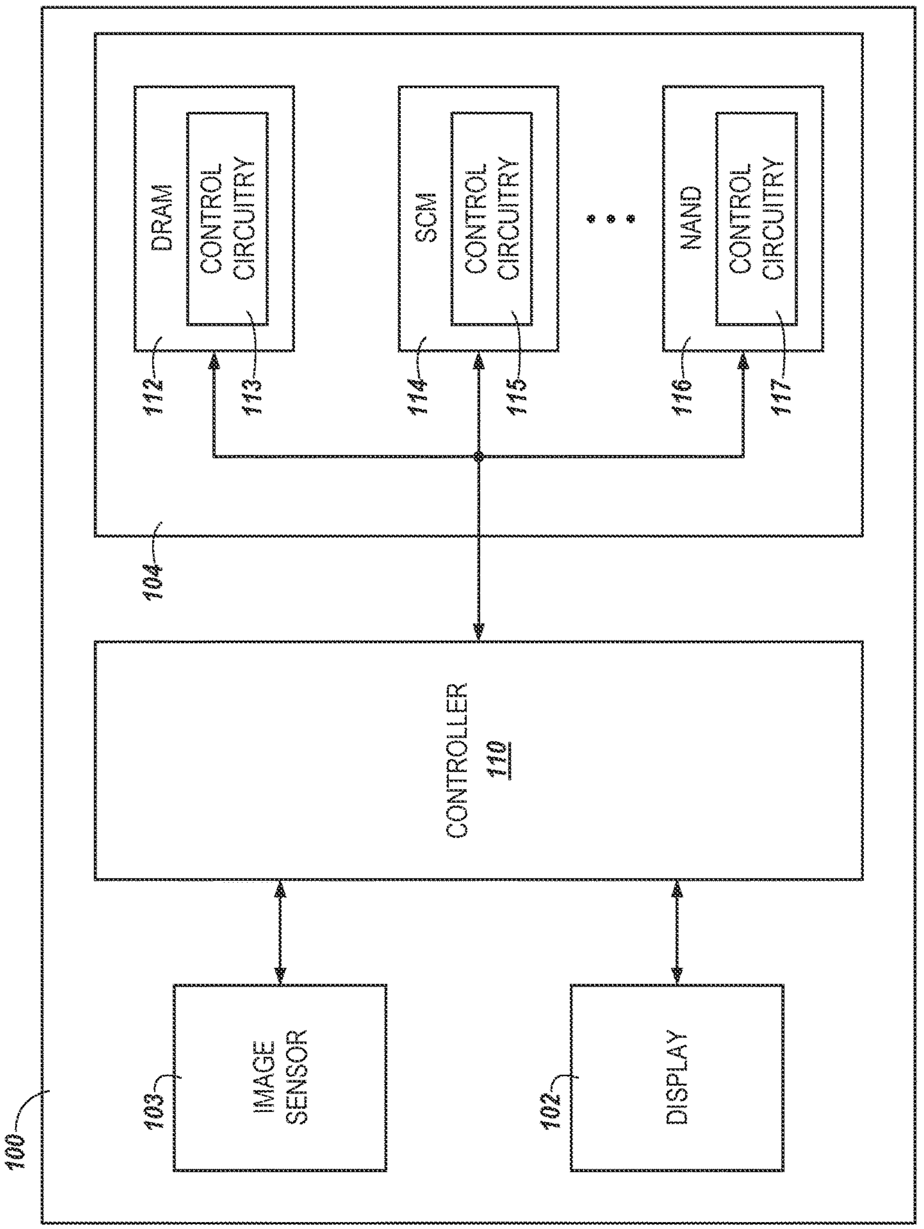
FIG. 1 is a functional block diagram in the form of an apparatus having a display, an image sensor, a memory device, and a controller in accordance with a number of embodiments of the present disclosure.

Apparatuses, machine-readable media, and methods related to image location based on a perceived interest and display position. Computing device displays (e.g., monitors, mobile device screens, laptop screens, etc.) can be used to view images (e.g., static images, video images, and/or text) on the display. Images can be received by the computing device from another device and/or generated by the computing device. A user of a computing device may prefer some images over other images and sort those images to various viewing locations on a display (e.g., viewing location). Images can be organized into viewing locations by the computing device for the convenience of the user. For instance, a computing device can include a controller and a memory device to organize the images based on a preference of the user. The preference can be based on a perceived interest of the image by the user. In an example, a method can include assigning, by a controller coupled to a memory device, a perceived interest to an image of a plurality of images, wherein the perceived interest is assigned based in part on a change in position of a display coupled to the memory device while the image is viewable on the display, selecting the image from an initial viewing location on the display responsive to the assigned perceived interest, and transferring the image to a different viewing location, wherein the initial viewing location and the different viewing location are visible on the display.

As used herein, the term "viewing location" refers to a location that can be visible on the display of a computing device. The display can be part of a user interface for a computing device, where the user interface allows the user to receive information from the computing device and provide inputs to the computing device. The viewing location can be selected by a user of the computing device. For example, a user can select a viewing location visible on the display to view the images allocated to the viewing location. The images allocated to a particular viewing location can share a common perceived interest.

As used herein, the term "perceived interest" refers to a level of importance an image is determined to possess. For instance, a perceived interest of an image may be an assignment corresponding to a user's subjective interest in the image. For example, a user may use a computing device such as a mobile device (e.g., a smartphone) equipped with an image sensor (e.g., a camera) to generate an image. In other examples, a computing device can receive an image from the internet, an email, a text message, or other transmission. In other examples, a computing device can receive (or otherwise obtain) an image from the internet, a screenshot, an email, a text message, or other transmission. Additionally, a computing device can generate groups of images based on criteria in an attempt to associate a perceived interest in the grouped images.

Computing devices can group images without requiring the input of a user. For example, some approaches to generating groups of images without input from the user of the computing device includes grouping images by a geographical location (e.g., GPS) in which they were generated and/or received, grouping by facial recognition of the subject in the image (e.g., grouping images according to who/ what is included in the image), and/or a time (e.g., a time of day, month, year, and/or season).

However, the images that are grouped by a computing device using location, facial recognition of a subject of the image, and/or time can be inaccurate and fail to capture a user's subjective perception of interest in an image. For example, the grouped images may not represent what the user subjectively (e.g., actually) perceives as interesting, but instead can group repetitive, poor quality, disinteresting, or otherwise undesired images. The inaccurate grouping of images can result in cluttered image viewing locations on a display of a computing device and result in situations where the user is frequently searching for a particular image. This may result in frustration, wasted time, resources, and computing power (e.g., battery life).

A user of a computing device may show another person an image when the user determines an image to be interesting. In some examples, the act of showing another person an image on a computing device involves moving the display of the computing device such that the display is at an angle that another person can view the image. In other examples, the act of showing another person an image on a computing device involves the different person being close enough to the display to be at an angle where the person can view the image. For example, a person can position him or herself next to or behind the user such that the display of the computing device is visible to the user and the person.

Examples of the present disclosures can ease frustration, clutter, conserve resources and/or computing power by grouping images together that share a perceived interest of the user. In an example embodiment, a perceived interest can be assigned to an image generated, received, and/or otherwise obtained by a computing device (e.g., a smartphone) based on a change in position of a display of a computing device while the image is viewable on the display. Said differently, if a user locates the image such that it is visible on the display, and moves the display to a suitable angle such that a different person can view the image, the computing device can assign the image a perceived interest corresponding to a desired preference.

In another example embodiment, a perceived interest can be assigned to an image generated, received, and/or otherwise obtained by a computing device (e.g., the camera of a smartphone) based on receiving an input from an image sensor coupled to the display when the image is visible on the display. Said differently, an image sensor coupled to the display can transmit facial recognition data if a person other than the user is at an angle such that the image is visible on the display (the person is standing next to or behind the user). The computing device can assign the image a perceived interest corresponding to a desired preference. Embodiments described herein include the computing device transferring (e.g., copying) images with a shared perceived interest to viewing locations on the display such that at a user can easily find images frequently presented and/or viewed by other people. As used herein, the term "transfer" refers to moving and/or creating a copy of an image and moving it from an initial viewing location to a different viewing location. In some examples, respective viewing locations can include other images that share common perceptions of interest.

Further, the computing device can group images based on the facial recognition input received that corresponds to the person that viewed the image. In other embodiments, undesired images generated by the computing device can be identified and be made available on the display such that a user can review and discard the images, thus removing clutter.

For example, images generated by the computing device that are not visible on the display when the display position is altered, and/or not provided for another person to view, may be assigned a perceived interest (e.g., a lack of perceived interest) corresponding to an undesired preference and moved to a viewing location such that a user can review and discard the images. Said differently, sometimes users can capture, receive, and/or otherwise obtain images on a computing device (e.g., a smartphone) that may not necessarily be important to the user, repetitive, etc. These infrequently viewed images can be grouped together and the computing device can prompt the user to discard the images.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 222 can reference element "22" in FIG. 2, and a similar element can be referenced as 322 in FIG. 3. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system including an apparatus 100 having a display 102, a memory device 106, and a controller 108 (e.g., a processor, control circuitry, hardware, firmware, and/or software) in accordance with a number of embodiments of the present disclosure. The memory device 106, in some embodiments, can include a non-transitory machine-readable medium (MRM), and/or can be analogous to the memory device 792 described with respect to FIG. 7.

The apparatus 100 can be a computing device, for instance, the display 102 may be a touchscreen display of a mobile device such as a smartphone. The controller 108 can be communicatively coupled to the memory device 106 and/or the display 102. As used herein, "communicatively coupled" can include coupled via various wired and/or wireless connections between devices such that data can be transferred in various directions between the devices. The coupling need not be a direct connection, and in some examples, can be an indirect connection.

The memory device 106 can include non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random access memory (SRAM), among others.

In other embodiments, as illustrated in FIG. 1, the memory device 106 can include one or more memory media types. FIG. 1 illustrates a non-limiting example of multiple memory media types in the form of a DRAM 112 including control circuitry 113, SCM 114 including control circuitry 115, and a NAND 116 including control circuitry 117. While three memory media types (e.g., DRAM 112, SCM 114, and NAND 116) are illustrated, embodiments are not so limited, however, and there can be more or less than three memory media types. Further, the types of memory media are not limited to the three specifically illustrated (e.g., DRAM 112, SCM 114, and/or NAND 116) in FIG. 1, other types of volatile and/or non-volatile memory media types are contemplated. In a number of embodiments, the controller 108, the memory media DRAM 112, SCM, 114, and/or NAND 116, can be physically located on a single die or within a single package, (e.g., a managed memory application). Also, in a number of embodiments, a plurality of memory media (e.g., DRAM 112, SCM, 114, and NAND 116), can be included on a single memory device.

A computing device can include an image sensor (e.g., a camera) 103. The image sensor 103 can generate images (video, text, etc.) which can be visible on the display 102. Additionally, the image sensor 103 can capture and/or receive input from objects, people, items, etc. and transmit that input to the controller 108 to be analyzed. In some examples, the images sensor 103 is a camera and can provide input to the controller 108 as facial recognition input. For example, the display 102 can be a portion of a mobile device including a camera (e.g., a smartphone).

The images generated by an image sensor 103 can be written (e.g., stored) on the memory device 106. The controller 108 can present the images on the display 102 responsive to a selection made by a user on the display 102. For instance, a user may select via a menu (e.g., a "settings" menu, a "images" or "pictures" menu, etc.) displayed on the display 102 to show images available to view on the display 102. Such a menu may give the user options as to what images the user wants to view and/or the user can manually select and customize images into groups. For example, a user may make a group of images that the user selects as a "favorite image" and other "favorite images" can be grouped together to create albums and/or folders which can be labeled as a user desires.

Manually selecting images as a "favorite image" can be tedious, and, as mentioned above, grouping the images without user input (e.g., by geographic location, facial recognition, etc.) can be inaccurate and include repetitive images that are undesired, thus leaving the user to still manually search and select a desired image. Grouping images by assigning them a perceived interest of the user can increase group accuracy and efficiency of the computing device and/or memory device 106.

Perceived interest can be assigned to images by determining if an image is visible on a display when the position of the display changes and/or by receiving input (e.g., facial recognition input) from the image sensor 103. A change in position of the display 102 includes the display 102 changing from an initial position to a subsequent position. An example of a change in position of a display 102 can include turning the display 102 from the perspective of a user viewing the display 102 a quantity of degrees such that it is viewable by another person, animal, and/or device. Selecting an image to be visible on a display 102, and changing the position of the display while the image is visible on the display 102 can be indicative that the image is perceived as interesting by the user. In other words, a user viewing an image on a display 102, and turning the display 102 to show another person can be indicative that the user has a preference for the image.

In a non-limiting embodiment, the controller 108 can be configured to assign, by the controller 108 coupled to a memory device 106, a perceived interest to an image of a plurality of images, where the perceived interest is assigned based in part on a change in position of a display 102 coupled to the memory device 106 while the image is viewable on the display. For instance, a user may be viewing an image on the display 102 of a smartphone and turn the smartphone such that the display 102 is viewable to a different person. Responsive to the change in position, the controller 108 can assign a perceived interest to the image viewable on the display 102. The controller 108 can be configured to select the image from an initial viewing location on the display 102 responsive to the assigned perceived interest; and transfer the image to a different viewing location, where the initial viewing location and the different viewing location are visible on the display 102. In this example, the controller 108 can copy the image from the initial viewing location (e.g., a default album or folder) and transfer the copy to a different viewing location (e.g., for images that have been detected to include a perceived interest).

In some examples, the controller 108 can be configured to include a threshold quantity of changes in position of the display 102 while an image is visible on the display 102. A threshold determined by a user can prevent accidental assignments of perceived interest to an image due to accidental changes in position of the display 102. For example, a user can use setting on the computing device to set a threshold at three or more changes in display 102 position before assigning a perceived interest corresponding to a desired preference to an image and/or prompting a computing device (e.g., a user) to confirm a perceived interest and/or a new viewing location on the display 102. While the number three is used herein, the threshold quantity can be more or less than three. Using this method, a user would be required to change the position of a display while an image is visible on the display three or more times before the computing device assigns a perceived interest corresponding to a desired preference. In some examples, a computing device can assign a perceived interest by receiving input into the image sensor 103.

For example, the apparatus 100 can be a computing device and include a memory device 106 coupled to the display 102 via the controller 108. An image sensor 103 can be coupled to the display 102 either directly or indirectly via the controller 108. To group images to viewing locations on the display based on a perceived interest, the controller 108 can be configured to select an image from a plurality of images to be viewable on the display 102. The image can be selected from an initial viewing location (e.g., a default album, and/or folder) on the display 102, generated by the image sensor 103, received (from another computing device via text or email), and/or otherwise obtained by the computing device. While the image is visible on the display, the user may desire to show the image to another person.

The controller 108 can be configured to receive an input from the image sensor 103 when the image of the plurality of images is visible on the display 102. The display 102 may experience a change in position and/or the display 102 may be in view of the other person (e.g., standing near the user). The input received by the controller 108 from the image sensor 103 may be facial recognition input related to the person viewing the image. The controller 108 can assign a perceived interest to the image based at least in part on the received input from the image sensor 103. The controller 108 may transfer the image from an initial viewing location on the display to a different viewing location on the display responsive to the assigned perceived interest.

In a non-limiting example, the computing device can be a smartphone, the image sensor 103 can be a camera of the smartphone and a user can configure the settings of the camera to capture facial recognition input when the camera is positioned such that it may collect facial data of a person, animal, etc. In this example, the camera can capture the facial recognition data while an image is visible on the display 102. The controller 108 coupled to the camera (e.g., the image sensor 103) can generate a new viewing location based on the facial recognition input and prompt the smartphone (e.g., the user of the smartphone) for confirmation of the new viewing location. The controller 108 can be configured to group together subsequent images with a common assigned perceived interest corresponding to the facial recognition input.

For instance, if a user selects an image on their smartphone, the user may show the image to their Mother (e.g., or any other person), the camera of the smartphone may receive facial recognition data from Mother, and the controller 108 may prompt the user to generate a new folder (e.g., a new viewing location) labeled as "Mother". Subsequently, the user may select a different image to show their Mother, and the controller 108 can add the different picture to the "Mother" folder when the facial data is collected. This can be accomplished without user input. In other examples, the controller 108 can determine that one or more images has a perceived interest that corresponds to a dislike, indifference, or an undesired preference by the user.

The controller 108 can assign a perceived interest corresponding to an undesired preference. This can be responsive to an image on the display 102 not changing position while the image is visible on the display 102. Additionally, other images that have not been selected by the user and/or been viewable on the display 102 while the display has changed position can be grouped together as having a perceived interest corresponding to an undesired preference. The grouped images having an undesired preference can be transferred to a folder to be reviewed by the user to be discarded. For instance, the controller 108 can transfer the image to a particular viewing location on the display 102. In some examples, the controller 108 can write image data corresponding to the images in viewing locations on the display 102 to a plurality of memory types.

In an example embodiment, the controller 108 can be coupled to a plurality of memory media types (e.g., DRAM 112, SCM 114, and/or NAND 116), where the images included in an initial viewing location can be written in a first memory media type (e.g., DRAM 112) and images included in the different viewing location can be written in a second memory media type (e.g., NAND 116). For example, the different viewing location on the display 102 may include images that are written to a memory media type that is more secure and/or more suitable for long term storage on the computing device. As such, the viewing locations written to the respective memory media types (e.g., DRAM 112, SCM 114, and/or NAND 116) can include other images that have been selected by the controller 108 based on a respective perceived interest.

Figure 2:
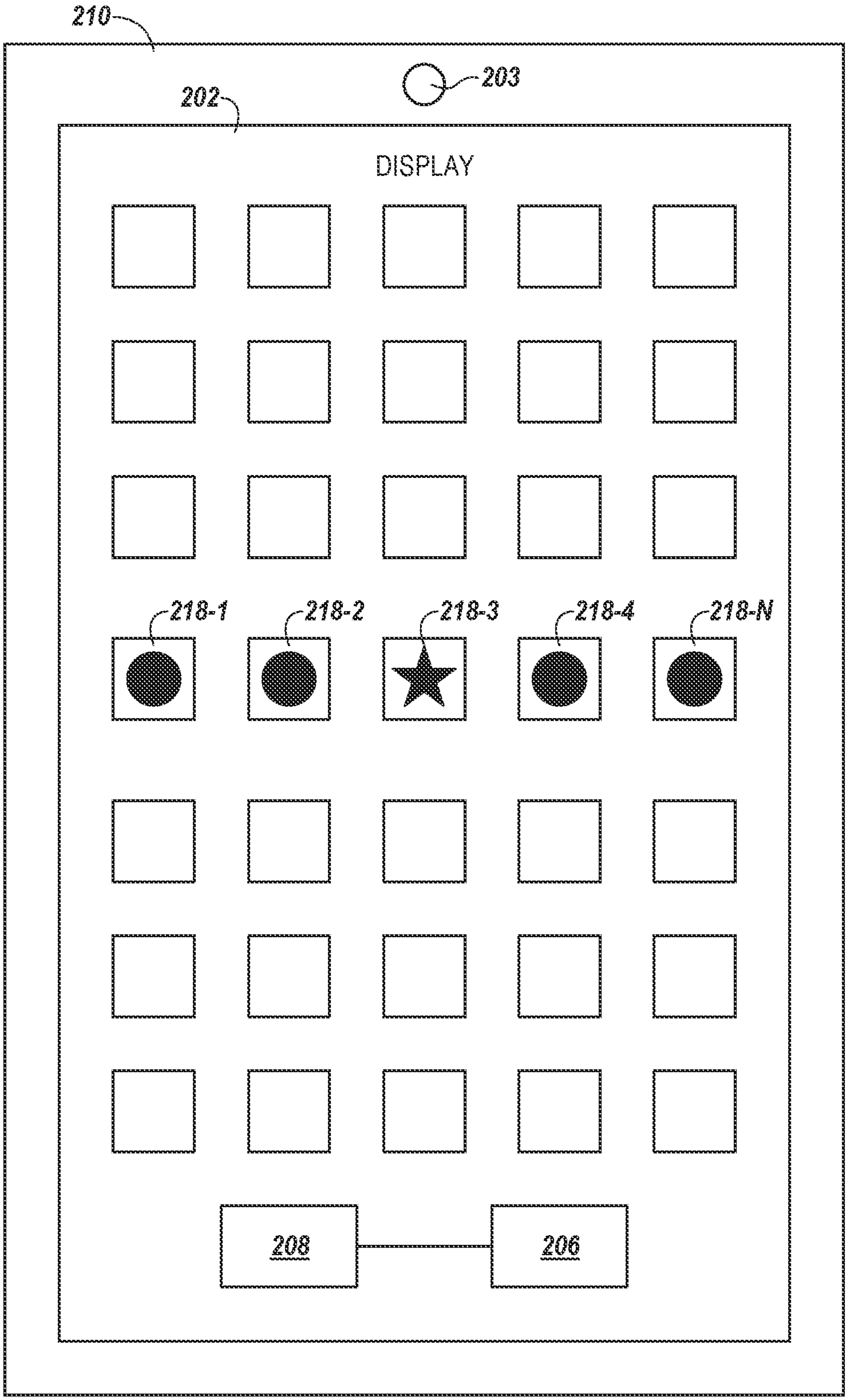
FIG. 2 is a diagram representing an example of a computing device including a display with visible images in accordance with a number of embodiments of the present disclosure.

FIG. 2 is a diagram representing an example of a computing device 210 including a display 202 with visible images 218 in accordance with a number of embodiments of the present disclosure. FIG. 2 illustrates a computing device 210 such as a mobile device including an image sensor 203 which is analogous to the image sensor 103 of FIG. 1, and a display 202 which is analogous to the display 102 of FIG. 1. The computing device 210 further includes a memory device 206, which is analogous to the memory device 106 of FIG. 1. The memory device 206 can be coupled to a controller 208 which can be analogous to the controller 108 of FIG. 1. FIG. 2 illustrates the display 202 as including a plurality of images 218-1, 218-2, 218-3, 218-4, and 218-N which can be referred to herein as images 218.

FIG. 2 illustrates a non-limiting example of a particular image 218-3 denoted with a star and other images 218-1, 218-2, 218-4, and 218-N which are denoted with a circle. The other squares illustrated in the display 202 are analogous to images 218 but are unmarked here as to not obscure examples of the disclosure.

The display 202 includes a plurality of images 218. In some examples, the plurality of images 218 may be included in an initial viewing location on the display 202 and presented in chronological order. Said another way, the plurality of images 218 can be the contents of an initial viewing location. For example, the plurality of images 218 can be images that are presented to a user in the order in which that have been generated by an image sensor 203 (e.g., a camera) and/or received, transmitted, or otherwise obtained by the computing device 210. A user can use an appendage (e.g., a finger) or a device (e.g., a stylus, a digital pen, etc.) to select one or more images 218-1, 218-2, 218-3, 218-4, 218-N from the plurality of images 218. The selection of a particular image 218-3 rather than other images 218-1, 218-2, 218-4, and/or 218-N can indicate a perceived interest corresponding to a desired preference of the user.

The controller 208 can use multiple methods to assign a perceived interest to an image 218. For example, the controller 206 can assign a perceived interest based on a selection of a particular image 218-3 such that the image 218-3 is visible on the display 202 while the display 202 changes position as will be described in connection with FIGS. 3A-3B. When the particular image 218-3 is selected, it can be enlarged such that is encompasses all or a majority of the display 202. A user can configure the computing device 210 (e.g., the controller 209) to assign a perceived interest to an image (e.g., image 218-3) corresponding to a desired preference of the user when it is selected from a group of images 218 to be visible on the display while the display changes position 3 or more times. While three or more is used as an example herein, the quantity of times that the display is required to change position can be greater or less than three times. The computing device 210 can store metadata, including a metadata value, associated with the image that can indicate the perceived interest of the image, the location of the image on the display, a grouping of the image, among other information that can be included in the metadata associated with an image. The elimination of the requirement of a user to manually denote an image as a "favorite image" can reduce clutter and frustration of the user experience of the computing device 210.

In another non-limiting example, the controller 208 can assign a perceived interest to one or more images 218 when an image 218 is shown to another person and the image sensor 203 can collect facial recognition data. For example, the controller 208 can assign a perceived interest corresponding to a desired preference to a particular image 218-3 when the image is selected and positioned on the display 202 such that another person (e.g., and/or an animal or device) can view the image.

In some examples, the computing device 210 and/or the controller 208 can be configured (e.g., through settings etc.) to generate a new viewing location corresponding to the facial recognition data collected, without user input. In other examples, the computing device 210 and/or the controller 208 can be configured to prompt the user for confirmation prior to generating a new viewing location corresponding to the facial recognition data collected.

In a non-limiting example, a user may be positioned in front of a computing device 210 such that the display 202 is visible to the user while the particular image 218-3 is visible on the display 202. A different person may position themselves next to and/or behind the user such that the person can also view the display 202 and the particular image 218-3. The controller 208 may assign perceived interest corresponding to a desired preference of the user to the image 218-3 when the image sensor 203 detect the other person is positioned to view the particular image 218-3. The image sensor 203 may collect facial recognition data from the person and the controller 208 may generate a new viewing location corresponding to the person to transfer the image 218-3.

In another non-limiting example, a user may be positioned in front of a computing device 210 such that the display 202 is visible to the user while the particular image 218-3 is visible on the display 202. The user may change the position of the display 202 such that a different person can also view the display 202 and the particular image 218-3. The controller 208 may assign perceived interest corresponding to a desired preference of the user to the image 218-3 when the image sensor 203 detect the other person is positioned to view the particular image 218-3 and/or when the display 202 is changed from an initial position to a subsequent position. The image sensor 203 may collect facial recognition data from the person and the controller 208 may generate a new viewing location on the display 202 corresponding to the person.

In some examples, a perceived interest can be assigned to images 218 that have not been selected, viewed by another person, and/or made visible on the display 202 while the position of the display 202 changes from an initial position to a subsequent position. For example, assume the images 218-1, 218-2, 218-4, and 218-N have not been selected, viewed by another person, and/or made visible on the display 202 while the position of the display 202 changes from an initial position to a subsequent position. In this example, the controller 208 may assign a perceived interest that that corresponds to an image that is undesired by the user. In this example, the images with a perceived interest that reflects a disinterest by the user can be sorted and transferred to a different viewing location on the display 202. In some examples, this viewing location may be used to prompt the user to discard these images to ease clutter and memory space on the memory device 206.

In some embodiments, the controller 208 can change a perceived interest for an image 218. For example, an image 218-1 can be assigned a perceived interest that corresponds to an undesired preference to a user of the computing device 210. Subsequently, responsive to the image 218-1 being selected, viewed by another person, and/or made visible on the display 202 while the position of the display 202 changes from an initial position to a subsequent position the controller 208 can assign a new perceived interest that corresponds to a desired preference by the user.

As will be discussed in connection with FIGS. 4A and 4B, the controller 208 can sort the plurality of images 218 by grouping the plurality of images 218 based on the perceived interest. This can be done without user input (e.g., upon setting up the computing device 210 the controller 208 can be configured with user preferences) or a user may select a prompt asking if sorting and/or grouping is a preference. For instance, upon loading the application, the controller 208 determines that the user may want to include a perceived interest in particular images 218 and may prompt the user for affirmation. Alternatively, the controller 208 can determine that the user may want to include a perceived interest in images that have not been selected, viewed by another person, and/or made visible on the display 202 while the position of the display 202 changes from an initial position to a subsequent position.

Figure 3A:
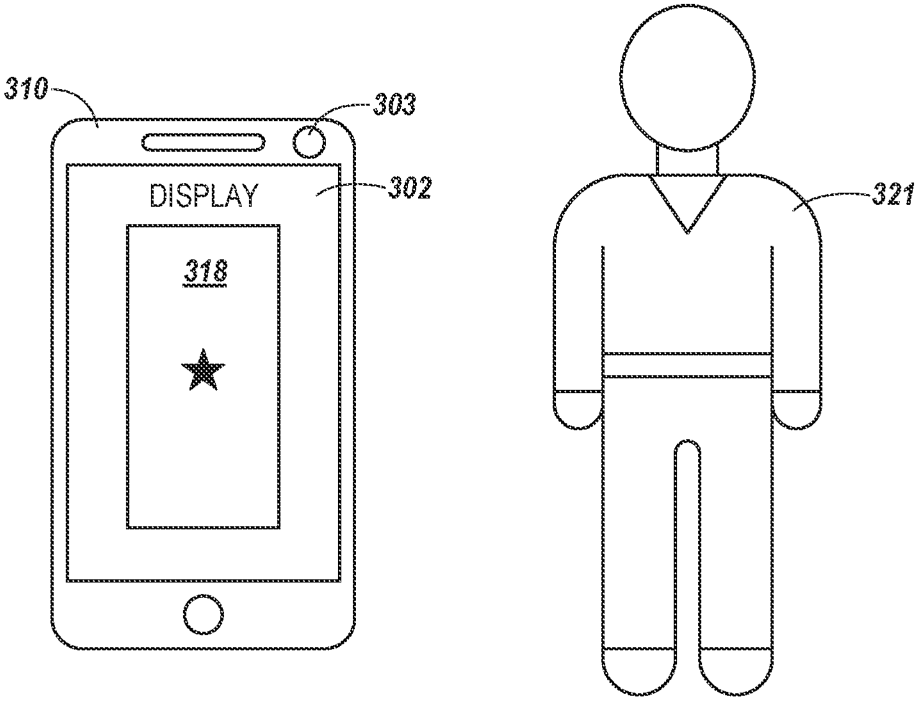
FIGS. 3A-3B are diagrams representing an example display including a visible image in accordance with a number of embodiments of the present disclosure.
Figure 3B:
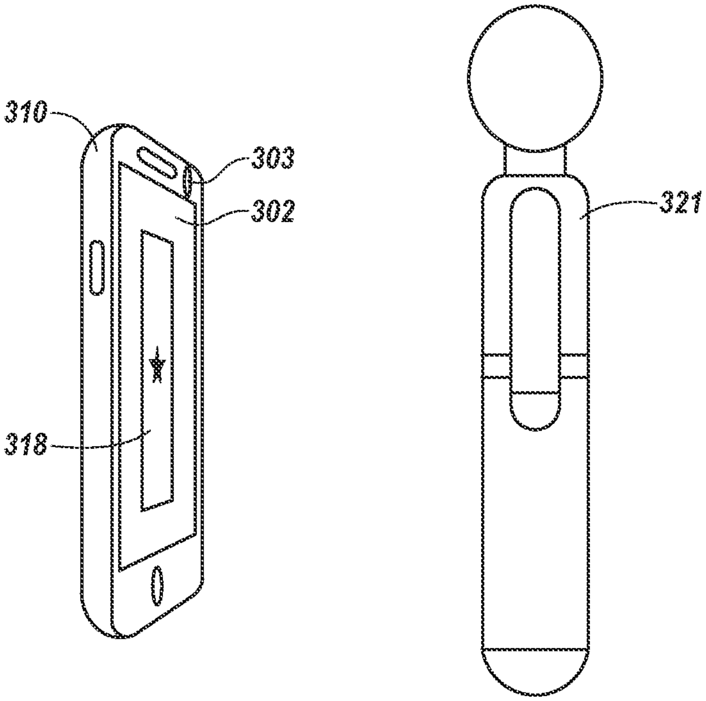

FIGS. 3A-3B are diagrams representing an example display 302 including visible image 318 in accordance with a number of embodiments of the present disclosure. FIGS. 3A-3B each illustrate a display 302 which is analogous to the displays 102 and 202 of FIGS. 1 and 2. The display 302 may be part of a computing device (e.g., the computing device 210 of FIG. 2) and be coupled to a controller (e.g., the controller 208 of FIG. 2) and a memory device (e.g., the memory device 206 of FIG. 2). FIGS. 3A-3B each include an image 318 which can be analogous to the images 218 of FIG. 2. FIGS. 3A-3B also illustrate a person 321. While the FIGS. 3A-3B are illustrated as including a single person, there may be more than one person. Further, while the depiction of FIGS. 3A-3B include an illustration of a human, any animal or device could be used.

FIG. 3A illustrates the display 302 including the visible image 318. In the illustration in FIG. 3A, the computing device 310 is in an initial position where the user (not illustrated) may be facing the display 318 such that the image 318 is visible to the user. As illustrated in FIG. 3A, the person 321 is not in a position to view the image 318. FIG.

3B illustrates an example of the display 302 coupled to the computing device 310 in a subsequent position. In this example, the display 302 has changed position from the initial position illustrated in FIG. 3A to a subsequent position illustrated by FIG. 3B. While the subsequent position of the person 321 of FIGS. 3A and 3B is to the right of the computing device 310, the person 321 could be oriented to the left of the computing device 310, in front of the computing device 310, and/or anywhere in between.

In the subsequent position illustrated by FIG. 3B, the image 318 is visible to the person 321. The controller of the computing device 310 can assign a perceived interest corresponding to a desired preference of the image 318 based on the image 318 being visible on the display 302 when the position of the display 302 changes from the initial position (of FIG. 3A) to the subsequent position (of FIG. 3B). In another example, the controller of the computing device 310 can receive an input from an image sensor 303 coupled to the controller when the display 302 is in the subsequent position; and transfer the image 318 to a new viewing location based on the input received from the image sensor.

Said differently, the subsequent position changes the angle of the display such that the person 321 can view the image 318. The image sensor 303 can collect input (e.g., facial recognition input) and generate a new viewing location to transfer the image 318 (and/or a copy of the image 318). In this example, the new viewing location may correspond to the person 321, and other subsequent images that are shown to the person 321 can be transferred to the new viewing location on the display 302. This can be done without user input. For instance, upon receiving a subsequent image, the controller can determine the facial recognition input is of the person 321 and transfer the subsequent image to the new viewing location without user prompts or, a user may select a prompt asking if this is a preference. For instance, upon receiving the subsequent image, the controller can determine that the user may want to transfer the image to the new viewing location based on the facial recognition input corresponding to the person 321 and may prompt the user for affirmation. In some examples, the controller of the computing device 310 may refrain from transferring the image 318 to a new viewing location.

In another non-limiting example, the controller of the computing device 310 can receive an input from an image sensor 303 coupled to the controller when the display 302 is in the subsequent position; and refrain from transferring the image 318 to a new viewing location based on the input received from the image sensor. For instance, the image sensor 303 may collect input (e.g., facial recognition input) and the controller 308 can generate a new viewing location based on the input received from the image sensor 303 to transfer the image 318 (and/or a copy of the image 318). The controller may prompt the user to confirm creating a new viewing location. The person 321 may be unknown (e.g., or infrequently encountered, etc.) by the user, and the user may not wish to dedicate a new viewing location to the unknown person 321.

In the above example, where the person 321 is unknown to the user, the controller may assign a perceived interest corresponding to an undesired preference to the image 318. In this example, the controller may further transmit a prompt to the computing device 310 and/or the user to discard the image 318 based on the perceived interest being that of an undesired preference.

Figures 4A, 4B:
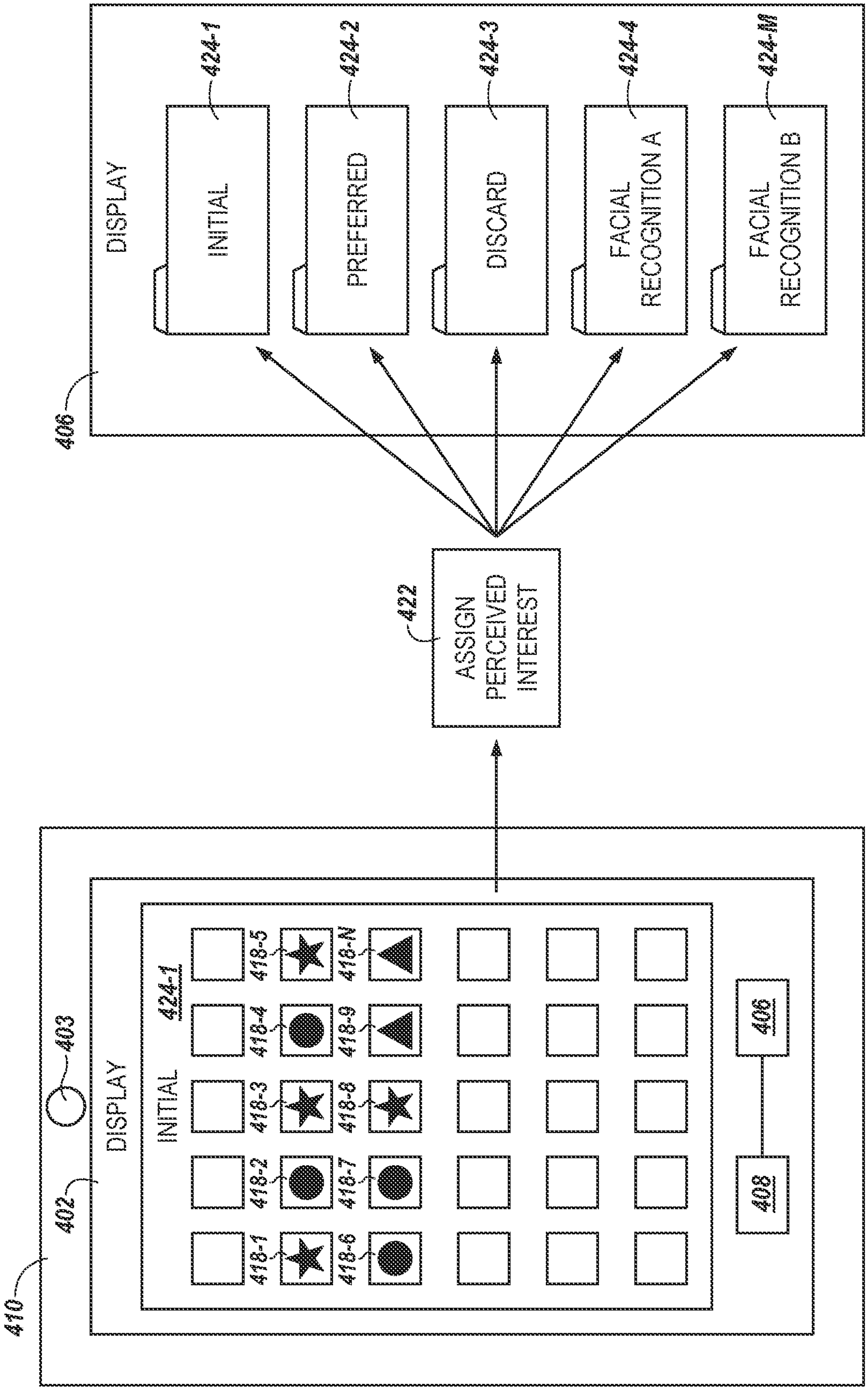
FIGS. 4A-4B are functional diagrams representing an example computing device for image location based on a perceived interest and display position in accordance with a number of embodiments of the present disclosure.

FIGS. 4A-4B are functional diagrams representing computing devices 410 for image location on a display 402 based on image location based on a perceived interest and display position in accordance with a number of embodiments of the present disclosure. FIGS. 4A and 4B each illustrate a display 402 which is analogous to the displays 102, 202, and 302 of FIGS. 1, 2, and 3A-3B and images 418-1 to 418-N, which are analogous to images 218 and 318 of FIGS. 2 and 3 and can be referred herein as images 418. The display 402 may be part of a computing device 410 and analogous to the computing device 210 of FIG. 2 and coupled to a controller 408 which can be analogous to the controllers 108 and 208 of FIGS. 1 and 2 and a memory device 406 which can be analogous to the memory devices 106 and 206 of FIGS. 1 and 2.

FIG. 4A illustrates images 418-1 to 418-N which are included in the initial viewing location 424-1. FIG. 4B illustrates image viewing locations visible on the display 402. The initial viewing location 424-1 can include each of the plurality of images 418. The images 418 can be viewable in the initial viewing location 424-1 in chronological order and/or be the default image viewing location for images generated, received, or otherwise obtained by the computing device 410. Another viewing location can be the preferred image viewing location 424-2 the images viewable here can include images that have been assigned (by the controller 408) a perceived interest corresponding to a desired preference of the user.

The discard viewing location 424-3 can include images that have been assigned (by the controller 408) a perceived interest corresponding to an undesired preference of the user. The discard viewing location 424-3 can include images that a user may not want to keep as they have not been viewed frequently or shown to another person. The controller 408 can prompt a user to review the images included in the discard viewing location 424-3 and discard the images from the computing device 410. Yet another viewing location can include images that correspond to facial recognition input collected by the image sensor 403. The facial recognition viewing location 424-M can include images that have been viewed by a person (e.g., the person 321 of FIG. 3). The images 418 may be grouped and transferred to a viewing location on the display 402 based at least in part on the perceived interest assigned by the controller 408. As described herein, transferring an image 418 can include generating a copy of the image 418 and transferring the copy to a different viewing location 424. In other words, the controller 408 can be further configured to generate a copy of an image 418 and transfer the copy of the image 418 from the initial viewing location 424-1 to the different viewing location 424-2, 424-3, 424-M.

As illustrated in FIG. 4A, the controller 408 can be configured to assign a perceived interest to each of the plurality of images 418. For instance, the controller 408 can be further configured to determine an assigned perceived interest for each of the plurality of images 418, and as illustrated in FIG. 4A, sort the plurality of images 418 into a plurality of groups based on the assigned perceived interest. For example, the images denoted with stars and triangles 418-1, 418-3, 418-5, 418-8, 418-9, and 418-N, can be included in a first group. The images denoted with circles 418-2, 418-4, 418-6, and 418-7 can be included in a second group.

In the above non-limiting example, each image 418-1, 418-3, 418-5, 418-8, 418-9, and 418-N included in the first group of the plurality of groups includes images with an assigned perceived interest corresponding to a desired preference. The images 418-1, 418-3, 418-5, 418-8, 418-9, and 418-N may have been assigned the perceived interest corresponding to the desired preference because they were shown to another person, the image(s) were viewable on the display 403 when the display 403 changed position from an initial position to a subsequent position, or a combination thereof.

Further, in the above non-limiting example, each image 418-2, 418-4, 418-6, and 418-7 included in the second group of the plurality of groups includes images with an assigned perceived interest corresponding to an undesired preference. The images 418-2, 418-4, 418-6, and 418-7 may have been assigned the perceived interest corresponding to the undesired preference because they were not shown to another person, the image(s) were not viewable on the display 403 when the display 403 changed position from an initial position to a subsequent position, or a combination thereof. The controller 408 may be further configured to transmit a prompt to the computing device 410 to discard the second group of images.

As mentioned, the controller 408 can group and sort the images 418 based on a perceived interest. The controller 408 can further transfer the images to viewing locations 424 based on the perceived interest assigned at box 422 of FIG. 4A. In some example, the images 418 can exist in multiple viewing locations 424.

For example, all of the images 418-1 to 418-N are viewable in the initial viewing location 424-1. The controller 408 may assign (at 422) images 418-1, 418-3, 418-5, 418-8, 418-9, and 418-N the perceived interest corresponding to the desired preference and transfer the images to the preferred viewing location 424-2 such that they are now viewable in the initial viewing location 424-1 and the preferred viewing location 424-2.

Further, the images denoted with a triangle 418-9 and 418-N may correspond to input from the image sensor corresponding to a person who has viewed the images 418-9 and 418-N and be transferred to the facial recognition viewing location 424-M. In this example, the images denoted with a triangle 424-9 and 424-M may be viewable in the initial viewing location 424-1, the preferred viewing location 424-2, and the facial recognition viewing location 424-M.

The images 418-2, 418-4, 418-6, and 418-7 may have been assigned the perceived interest (at 422) corresponding to the undesired preference because they were not shown to another person, the image(s) were not viewable on the display 403 when the display 403 changed position from an initial position to a subsequent position, or a combination thereof. These images may be viewable initial viewing location 424-1 and the discard viewing location 424-3 such that a user can review the discard viewing location 424-3 and discard the images as desired. In some examples, discarding an image from any of the plurality of viewing locations 424 can discard the image from the computing device 410.

Figure 5:
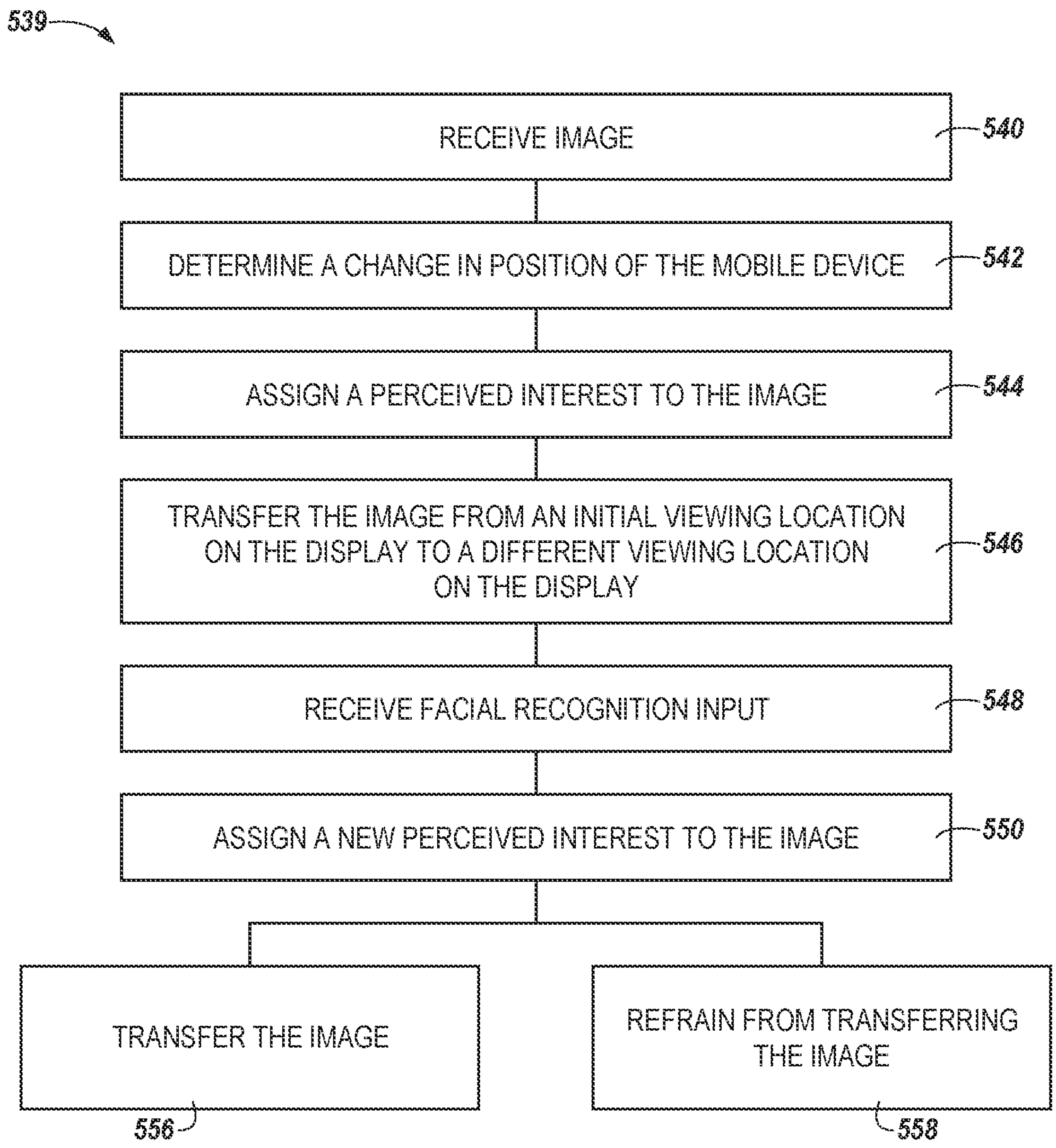
FIG. 5 is a block diagram for an example of image location based on a perceived interest and display position in accordance with a number of embodiments of the present disclosure.

FIG. 5 is a block diagram 539 for an example of image location based on a perceived interest and display position in accordance with a number of embodiments of the present disclosure. FIG. 5 describes a computing device (e.g., the computing device 410 of FIG. 4) which is equipped with a camera to generate images and a controller (e.g., the controller 108 of FIG. 1) to receive, transmit, or otherwise obtain images. At box 540 the computing device can generate (e.g., or receive, etc.) an image and the controller can receive the image. The image can be saved to an initial viewing location (e.g., the initial viewing location 424-1 of FIG. 4B). At box 542, the controller can determine a change in position of the display of the mobile device.

For example, the controller can determine when the display is in an initial position and a subsequent position, where the change in position of the display includes the display moving from the initial position to the subsequent position. At, block 544, the controller can assign a perceived interest to the image. If the image was not visible on the display while the display changed position from the initial position to the subsequent position, the controller may assign a perceived interest that corresponds to an undesired preference. If the image was visible on the display while the display changed position from the initial position to the subsequent position, the controller may assign a perceived interest that corresponds to an undesired preference.

At box 546, the controller can transfer the image from the initial viewing location (e.g., the initial viewing location 424-1) on the display to a different viewing location (e.g., the preferred viewing location 424-2, or the discard viewing location 424-3 of FIG. 4) on the display. At block 548, the controller may receive facial recognition input from an input sensor (e.g., a camera on the mobile device). The facial recognition input can be from a person that the user showed the image to when the image visible on the display changed position from the initial position to the subsequent position.

At block 550, the controller may assign a new perceived interest to the image. For example, the controller may assign a new perceived interest and/or refrain from transferring the image at 558 to a viewing location that corresponds to the facial recognition input. In this example, the user may have declined a prompt to generate a viewing location that corresponded to the person. In another example, the controller can transfer the image at 556 to a viewing location that corresponds to the facial recognition input. While a "preferred viewing location" a "discard viewing location" and an "initial viewing location" are discussed, there could be additional and/or different viewing locations such as "edit viewing location," frequently emailed and/or texted viewing location" etc. could be used.

In a non-limiting example, the mobile device may be configured by the user to include a threshold. The user may have configured settings on the mobile device to set a threshold requiring the change in the display from the initial position (of FIG. 3A) to the subsequent position (of FIG. 3B) to occur three or more times prior to assigning a perceived interest that corresponds to a desired preference to a user of the computing device.

In in a non-limiting example, the controller can (at 542) determine when the display is in an initial position and a subsequent position, where a change in position of the display includes the display moving from the initial position to the subsequent position and a plurality of viewing locations include a discard viewing location and a subset of the respective plurality of images (e.g., the images 418 denoted with a circle of FIG. 4) are sorted into the discard viewing location responsive to having been viewable on the display while the display is in the subsequent position less than a threshold quantity of times.

In another non-limiting example the controller can determine (at 542) when the display is in an initial position and a subsequent position, where a change in position of the display includes the display moving from the initial position to the subsequent position and the plurality of viewing locations include a preferred viewing location and the respective plurality of images sorted into the preferred viewing location have been viewable on the display while the display is in the subsequent position greater than a threshold quantity of times.

Figure 6:
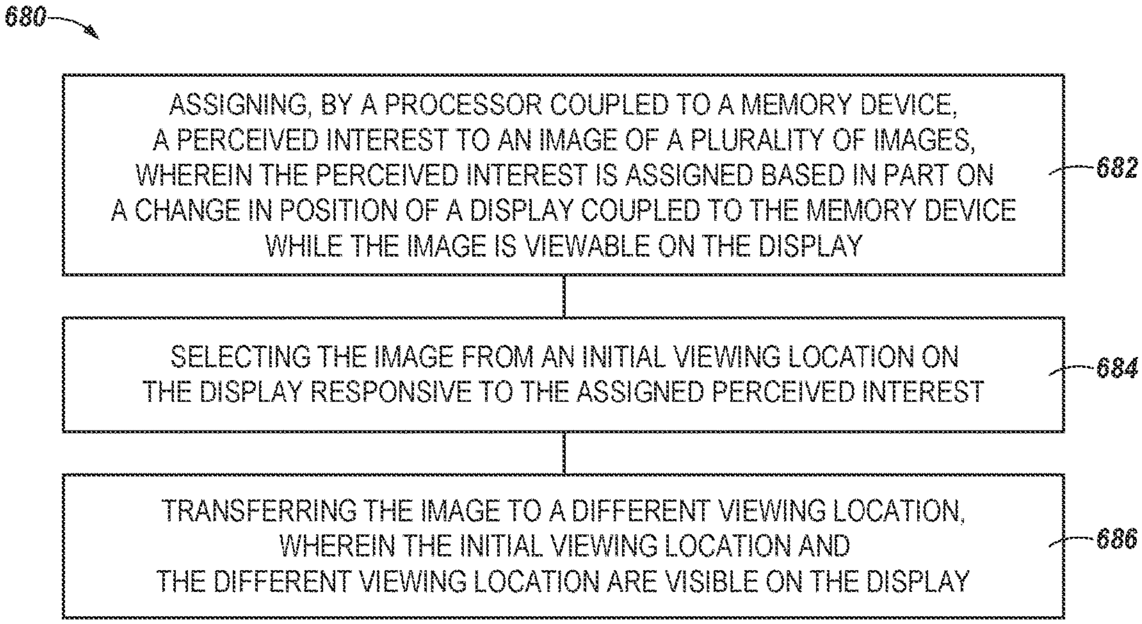
FIG. 6 is flow diagram representing an example method for image location based on a perceived interest and display position in accordance with a number of embodiments of the present disclosure.

FIG. 6 is flow diagram representing an example method 680 for image location based on a perceived interest and display position in accordance with a number of embodiments of the present disclosure. At 682, the method 680 includes assigning, by a processor coupled to a memory device, a perceived interest to an image of a plurality of images, wherein the perceived interest is assigned based in part on a change in position of a display coupled to the memory device while the image is viewable on the display.

For example, the change in position of the display includes the display moving from the initial position to the subsequent position. In other example, a perceived intertest can be assigned based on input received by the computing device via an image sensor.

At 682, the method 680 includes selecting the image from an initial viewing location on the display responsive to the assigned perceived interest. The perceived interest can correspond to an undesired preference to a user of the computing device and the image can be transferred from an initial viewing location to a discard viewing location. In other examples, the perceived interest can correspond to a desired preference to a user of the computing device and the image can be transferred from an initial viewing location to a preferred viewing location.

Said differently, at 684, the method 680 can include transferring the image to a different viewing location, wherein the initial viewing location and the different viewing location are visible on the display.

In a number of embodiments, methods according the present disclosure can include identifying data for an image displayed via a user interface, determining a relative position of the user interface or input from a sensor, or both, while the image is displayed on the user interface, and writing, to memory coupled to the user interface, metadata associated with the data for the image based at least in part on the relative position of the user interface or input from the sensor.

Embodiments of the present disclosure can also include reading the metadata from the memory, and displaying the image at a location on the user interface or for a duration, or both, based at least in part on a value of the metadata.

Embodiments of the present disclosure can also include reading the metadata from the memory, and writing the data for the image to a different address of the memory or an external storage device based at least in on a value of the metadata.

Embodiments of the present disclosure can also include reading the metadata from the memory, and modifying the data for the image based at least in part on the value of the metadata.

Figure 7:
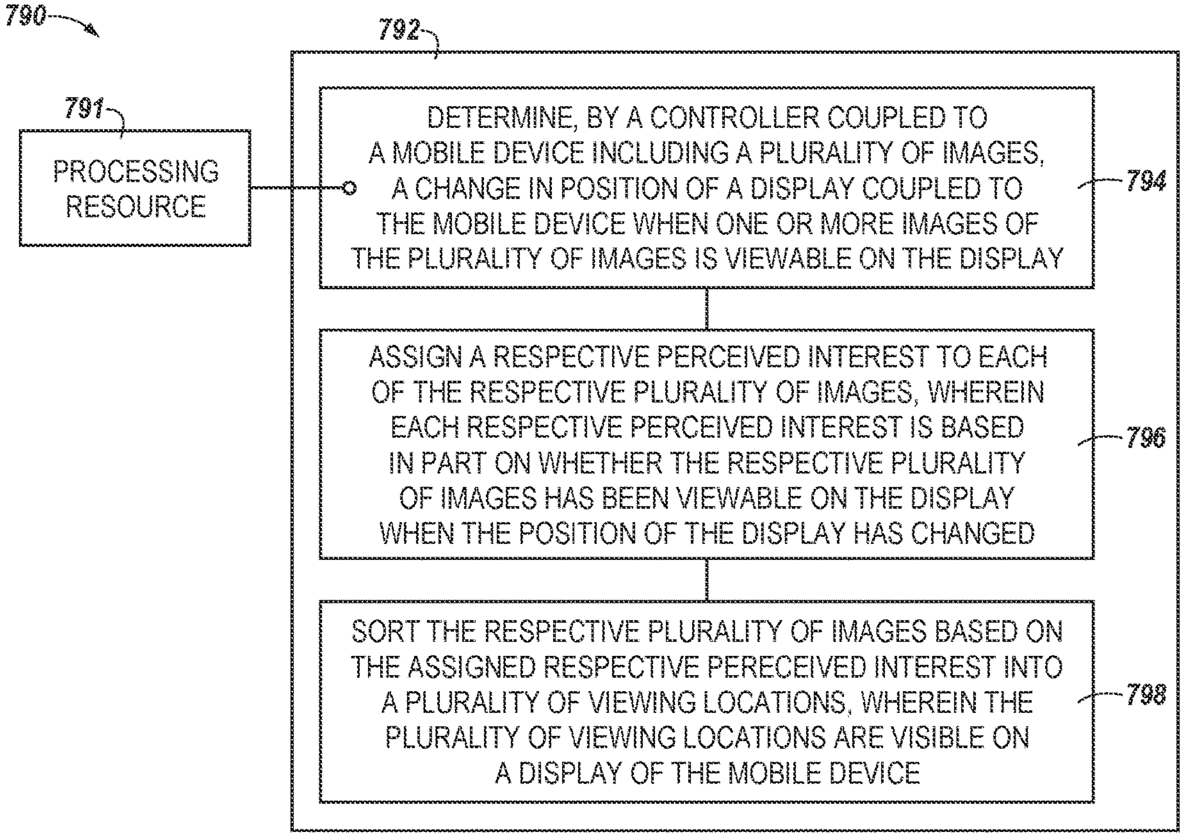
FIG. 7 is a functional diagram representing a processing resource in communication with a memory resource having instructions written thereon for image location based on a perceived interest and display position in accordance with a number of embodiments of the present disclosure.

FIG. 7 is a functional diagram representing a processing resource 791 in communication with a memory resource 792 having instructions 794, 796, 798 written thereon for image location based on a perceived interest and display position in accordance with a number of embodiments of the present disclosure. The memory device 792, in some embodiments, can be analogous to the memory device 106 described with respect to FIG. 1. The processing resource 791, in some examples, can be analogous to the controller 108 describe with respect to FIG. 1.

A system 790 can be a server or a computing device (among others) and can include the processing resource 791. The system 790 can further include the memory resource 792 (e.g., a non-transitory MRM), on which may be stored instructions, such as instructions 794, 796, and 798. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 792 may be electronic, magnetic, optical, or other physical storage device that stores executable instructions. Thus, the memory resource 792 may be, for example, a non-transitory MRM comprising Random Access Memory (RAM), an Electrically-Erasable Programmable ROM (EEPROM), a storage drive, an optical disc, and the like. The memory resource 792 may be disposed within a controller and/or computing device. In this example, the executable instructions 794, 796, and 798 can be "installed" on the device. Additionally, and/or alternatively, the memory resource 792 can be a portable, external or remote storage medium, for example, that allows the system 790 to download the instructions 794, 796, and 798 from the portable/external/remote storage medium. In this situation, the executable instructions may be part of an "installation package". As described herein, the memory resource 792 can be encoded with executable instructions for image location based on perceived interest.

The instructions 794, when executed by a processing resource such as the processing resource 791, can include instructions to determine, by a controller coupled to a mobile device including a plurality of images, a change in position of a display coupled to the mobile device when one or more images of the plurality of images is viewable on the display. In some examples mentioned herein, the computing device may be configured by the user to include a threshold. In a non-limiting example, the user may have configured settings on the computing device to set a threshold requiring the change in the display from the initial position (of FIG. 3A) to the subsequent position (of FIG. 3B) to occur three or more times prior to assigning a perceived interest that corresponds to a desired preference to a user of the computing device.

The instructions 796, when executed by a processing resource such as the processing resource 791, can include instructions to assign a respective perceived interest to each of the respective plurality of images, wherein each respective perceived interest is based in part on whether the respective plurality of images has been viewable on the display when the position of the display has changed. The plurality of images can be assigned different perceived interest. In some examples, one or more of the images can correspond to a person that has viewed the images (e.g., via facial recognition data received by the computing device).

The instructions 798, when executed by a processing resource such as the processing resource 791, can include instructions to sort the respective plurality of images based on the assigned respective perceived interest into a plurality of viewing locations, wherein the plurality of viewing locations are visible on a display of the mobile device. The plurality of viewing locations can include a discard viewing location, a preferred viewing location, and/or a facial recognition viewing location.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

showing an image on a display of a computing device to a first user;

showing the image on the display of the computing device to a second user;

receiving facial recognition data from an image sensor of the second user viewing the image on the display;

storing the image in memory of the computing device at least partially based on the facial recognition data of the second user;

showing a different image on the display to the second user;

receiving different facial recognition data from the image sensor of the second user viewing the different image on the display; and storing the different image in the memory of the computing device at least partially based on the different facial recognition data of the second user.

2. The method of claim 1, further comprising storing the image in a folder in response to showing the image on the display of the computing device to the second user.

3. The method of claim 1, further comprising creating a folder at least partially based on the facial recognition data of the second user.

4. The method of claim 3, further comprising prompting the first user for confirmation prior to creating the folder.

5. The method of claim 3, further comprising storing the image in the created folder in response to creating the folder.

6. The method of claim 5, further comprising determining the different facial recognition data is of the second user.

7. The method of claim 6, further comprising storing the different image in the created folder at least partially based on determining the different facial recognition data is of the second user.

8. The method of claim 7, further comprising prompting the first user to store the different image in the created folder.

9. The method of claim 8, further comprising storing the different image in the created folder in response to receiving an affirmation from the first user.

10. A non-transitory machine-readable medium storing instructions executable to:

show an image from a first folder stored in memory of a mobile device on a display of the mobile device to a first user;

show the image on the display of the mobile device to a second user;

receive facial recognition data from the image sensor of the second user viewing the image on the display;

transfer the image from the first folder to a second folder stored in the memory of the mobile device at least partially based on the facial recognition of the second user;

show a different image to the first user;

show the different image to a third user; and receive different facial recognition data from the image sensor of the third user viewing the different image on the display.

11. The medium of claim 10, further comprising the instructions executable to store the image in multiple folders stored in the memory.

12. The medium of claim 11, further comprising the instructions executable to store the image in the first folder.

13. The medium of claim 12, further comprising the instructions executable to prompt the first user to create a new folder corresponding to the third user.

14. The medium of claim 13, further comprising the instruction executable to receive a decline from the first user in response to the prompt.

15. An apparatus, comprising:

an image sensor;

a memory;

a display; and a controller configured to:

show an image on the display;

receive facial recognition data from a person other than a user of the apparatus via the image sensor;

store the image in the memory at least partially based on the facial recognition data from the person;

show a different image on the display;

receive different facial recognition data from the person via the image sensor; and store the different image in the memory at least partially based on the different facial recognition data from the person.

16. The apparatus of claim 15, wherein the image sensor is a camera.

17. The apparatus of claim 15, wherein the apparatus is a smartphone.

18. The apparatus of claim 15, wherein the image is a static image, a video image, or text.

* * * * *